(12) United States Patent
Nakai (10) Patent No.: US 6,204,928 B1
(45) Date of Patent: *Mar. 20, 2001

(54) DATA PROCESSING APPARATUS AND A METHOD FOR CONTROLLING THE APPARATUS

(75) Inventor: Hironobu Nakai, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,575

(22) Filed: Oct. 1, 1996

(30) Foreign Application Priority Data

Oct. 11, 1995 (JP) .................................................. 7-263076

(51) Int. Cl.[7] .............................. B41B 15/00; B41J 15/00; H04N 1/21; H04N 1/00

(52) U.S. Cl. ...................... 358/1.15; 358/1.14; 358/296; 358/404; 358/444; 399/8; 399/9; 399/76

(58) Field of Search .......................... 395/1.14; 358/404, 358/444, 468, 296, 401, 438, 442; 399/8, 9, 11, 76, 85

(56) References Cited

U.S. PATENT DOCUMENTS

| | | | |
|---|---|---|---|
| 5,287,194 | * | 2/1994 | Lobiondo ............................ 395/114 |
| 5,335,048 | * | 8/1994 | Takano et al. ...................... 355/204 |
| 5,410,416 | * | 4/1995 | Amberg et al. ..................... 358/405 |
| 5,477,339 | * | 12/1995 | Sugawara et al. .................. 358/406 |
| 5,493,408 | * | 2/1996 | Kurogane et al. .................. 358/296 |
| 5,559,933 | * | 9/1996 | Boswell .............................. 395/114 |
| 5,694,529 | * | 12/1997 | Fromherz ............................ 395/114 |

* cited by examiner

Primary Examiner—Edward L. Coles
Assistant Examiner—Twyler Lamb
(74) Attorney, Agent, or Firm—Fitzpatrick, Cella, Harper & Scinto (57) ABSTRACT

A data processing apparatus includes at least one processor which receives data from an input unit. A setting unit sets a time at which data may be input by the input unit, and a determination unit determines if the current time corresponds to the set time. When the current time corresponds to the set time, the input data is stored in a storage unit.

28 Claims, 8 Drawing Sheets

| NAME OF OPTIONAL BOARD | STARTING DATE | TIME | INTERVAL | FREQUENCY | CURRENT VERSION |
|---|---|---|---|---|---|
| CORE UNIT | 1995.07.01 | 01:00 | EVERY 6 DAYS | CONTINUOUS | VER.4 |
| FACSIMILE UNIT | 1995.07.07 | 01:00 | EVERY 16 DAYS | 5 | VER.4 |
| FILE UNIT | 1995.06.23 | 00:00 | EVERY 2 WEEKS | 30 | VER.1 |
| NETWORK I/F UNIT | 1995.03.21 | 12:15 | EVERY 6 WEEKS | 10 | VER.3 |
| FORMATTER UNIT | 1995.04.01 | 23:45 | NONE | 0 | VER.1 |
| IMAGE MEMORY UNIT | 1995.05.05 | 04:00 | EVERY WEEK | 3 | VER.2 |
| PRINTER UNIT | 1995.09.01 | 04:30 | EVERY MONTH | 5 | VER.3 |
| READER UNIT | 1995.08.15 | 23:00 | EVERY 2 MONTHS | 3 | VER.3 |

DATA PROCESSING APPARATUS AND A METHOD FOR CONTROLLING THE APPARATUS

BACKGROUND OF THE INVENTION

1. Field of the Invention

This invention relates to an image forming apparatus for processing data and a method for controlling the apparatus, and more particularly, to a data processing apparatus for performing various types of processing by at least one functional unit and a method of controlling the apparatus.

2. Description of the Related Art

Apparatuses, such as digital copiers or the like, capable of performing various types of processing by setting functional boards for realizing, for example, a facsimile function and a computer interface function therein are known. In such a functional board, program data for controlling the function to be realized by the board, and the like are stored. When it is intended to improve or change the function, the board is replaced by a new functional board, or processing of rewriting the program data into new program data is performed by an operation of a serviceman.

In the above-described conventional approach, however, the use of another board for improving or changing the function results in additional cost.

When rewriting program data in order to realize a new function, the serviceman must visit the user resulting in increased time and labor. If a plurality of apparatuses for which programs must be rewritten are present, the amount of time and laber further increases.

If the amount of program data to be rewritten is large, the concerned apparatus cannot be used for a long time period during the rewriting operation.

SUMMARY OF THE INVENTION

It is an object of the present invention to provide a data processing apparatus and a method of controlling the apparatus in which the above-described problems are solved.

It is another object of the present invention to provide a data processing apparatus and a method of controlling the apparatus in which a function can be efficiently improved or changed.

It is still another object of the present invention to provide a data processing apparatus and a method of controlling the apparatus in which a function is improved or changed without human intervention.

It is yet another object of the present invention to provide a data processing apparatus and a method of controlling the apparatus in which a function is improved or changed at a desired timing.

According to one aspect, the present invention which achieves these objectives relates to a data processing apparatus for performing processing by at least one processing means, comprising input means for inputting data for performing the processing by the processing means, setting means for setting a time to input the data by the input means, determination means for determining if the current time has reached the time set by the setting means, and means for storing the data input by the input means in storage means when the determination means has determined that the current time has reached the set time.

According to another aspect, the present invention which achieves these objectives relates to a method of controlling a data processing apparatus for performing processing by at least one processing means, comprising the steps of inputting data for performing the processing by the processing means, setting a time to input the data in the inputting step, determining if the current time has reached the time set in the setting step, and storing the data input in the inputting step in storage means when the determining step has determined that the current time has reached the set time.

The foregoing and other objects, advantages and features of the present invention will become more apparent from the following description of the preferred embodiment taken in conjunction with the accompanying drawings.

DESCRIPTION OF THE PREFERRED EMBODIMENT

A preferred embodiment of the present invention is described in detail below with reference to the drawings.

Figure 1:
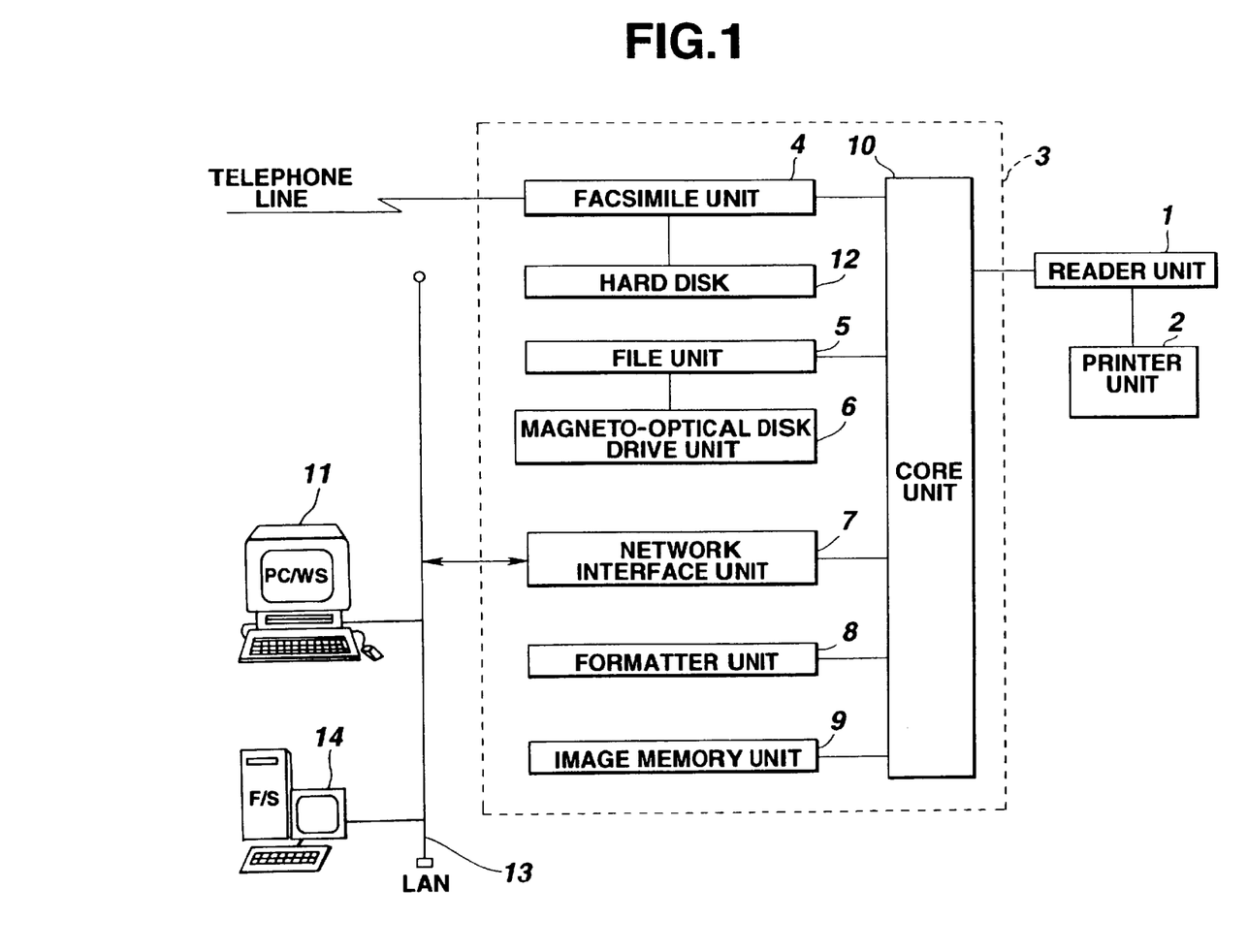
FIG. 1 is a schematic block diagram illustrating the configuration of an image processing apparatus according to an embodiment of the present invention.

FIG. 1 is a block diagram illustrating the configuration of an image processing apparatus according to the preferred embodiment. In FIG. 1, a reader unit 1 reads an image of an original, and outputs data corresponding to the image to a printer unit 2 and an image input/output control unit 3. The printer unit 2 records an image corresponding to the image data received from the reader unit 1 and the image input/output control unit 3 on a recording sheet. The image input/output control unit 3 is connected to the reader unit 1, and comprises a facsimile unit 4, a file unit 5, a network interface unit 7, a formatter unit 8, an image memory unit 9 and a core unit 10. Each of the units 4, 5, 7, 8, 9 and 10 includes components, necessary for realizing the function of the unit 3, provided on a single board. The apparatus can operate as a local digital copier only with the reader unit 1 and the printer unit 2 without connecting the image input/output control unit 3.

The facsimile unit 4 expands compressed image data received via a telephone line, and transfers the expanded image data to the core unit 10. The facsimile unit 4 also compresses image data transferred from the core unit 10, and transmits the compressed image data via the telephone line. A hard disk 12 is connected to the facsimile unit 4 in order to temporarily store received compressed image data.

A magneto-optical disk drive unit 6 is connected to the file unit 5, which compresses image data transferred from the core unit 10, and stores the compressed image data in a magneto-optical disk set in the magnetooptical-disk drive unit 6 together with a keyword for retrieving the image data.

The file unit 5 retrieves the compressed image data stored in the magneto-optical disk based on the keyword transferred via the core unit 10, expands the retrieved compressed image data, and transfers the expanded image data to the core unit 10.

The network interface unit 7 is connected to a LAN (local area network) cable 13, and operates as an interface between a personal computer/work station (PC/WS) 11 and a file server 14 connected to the LAN cable 13, and the core unit 10.

The formatter unit 8 develops code data representing an image transferred from the PC/WS 11 into image data which is recorded by the printer unit 2. The image memory unit 9 temporarily stores data trasferred from the PC/WS 11.

Although the function of the core unit 10 is described later, the core unit 10 controls the flow of data between respective units of the reader unit 1, the facsimile unit 4, the file unit 5, the network interface unit 7, the formatter unit 8 and the image memory unit 9.

Figure 2:
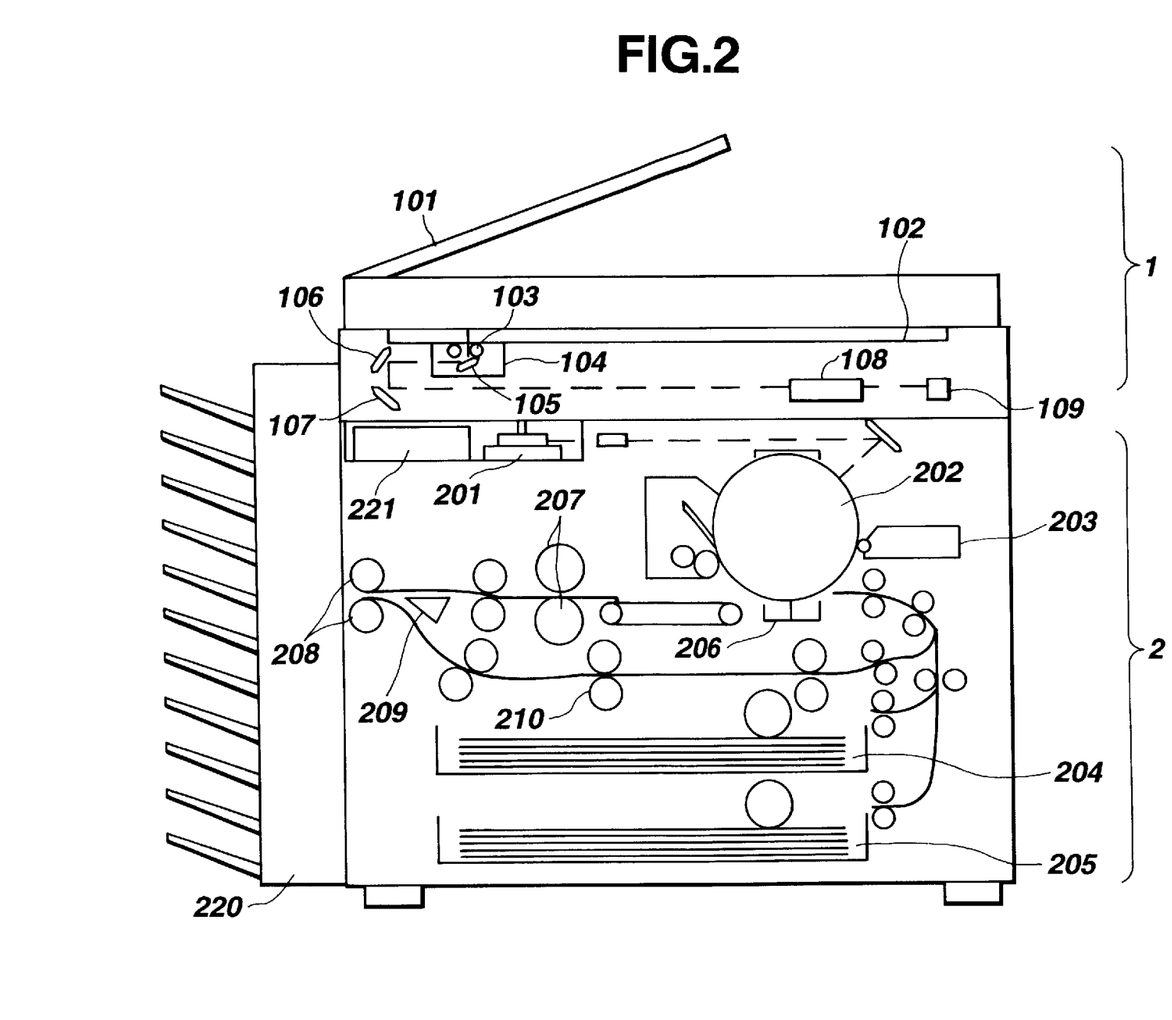
FIG. 2 is a cross-sectional view of a reader unit 1 and a printer unit 9 shown in FIG. 1.

FIG. 2 is a cross-sectional view of the reader unit 1 and the printer unit 2.

An original-feeding unit 101 of the reader unit 1 sequentially feeds originals starting from the last page, onto a platen glass 102, reads the fed original, and discharges the read original on the platen glass 102 after completing the reading operation. When the original has been conveyed onto the platen glass 102, a lamp 103 is lit and the movement of a scanner unit 104 is started to perform exposure scanning of the original. Reflected light from the original at that time is guided to a CCD (charge-coupled device) image sensor (hereinafter termed a "CCD") 109 by mirrors 105, 106 and 107 and a lens 108. The image of the original thus scanned is read by the CCD 109. Image data output from the CCD 109 is subjected to predetermined processing, and is then transferred to the printer unit 2 and the core unit 10 of the image input/output control unit 3.

A laser driver 221 of the printer unit 2 drives a laser light-emitting unit 201 so that laser light corresponding to the image data output from the reader unit 1 is emitted from the laser light-emitting unit 201. The laser light is projected onto a photosensitive drum 202, and a latent image corresponding to the laser light is formed on the photosensitive drum 202. A developing unit 203 provides the latent image on the photosensitive drum 202 with a developer. A recording sheet is fed and conveyed to a transfer unit 206 from one of cassettes 204 and 205 in synchronization with the start of irradiation of the laser light, and the developer adhering to the photosensitive drum 202 is transferred onto the recording sheet. The recording sheet having the developer adhering thereto is conveyed to a fixing unit 207, which fixes the developer on the recording sheet using heat and pressure. The recording sheet passing through the fixing unit 207 is discharged by discharging rollers 208. A sorter 220 sorts discharged recording sheets by accommodating them in corresponding bins. When sorting is not set, the sorter 220 accommodates discharged recording sheets in the uppermost bin. When duplex recording is set, the recording sheet is first conveyed to the discharging rollers 208. Then, the directions of rotation of the discharging rollers 208 are reversed to guide the recording sheet to a refed-sheet conveying path by a flapper 209. When multiplex recording is set, the recording sheet is guided to the refed-sheet conveying path without being conveyed to the discharging rollers 208 by the flapper 209. The recording sheet guided to the refed-sheet conveying path is fed to the transfer unit 206 at the above-described timing.

Figure 3:
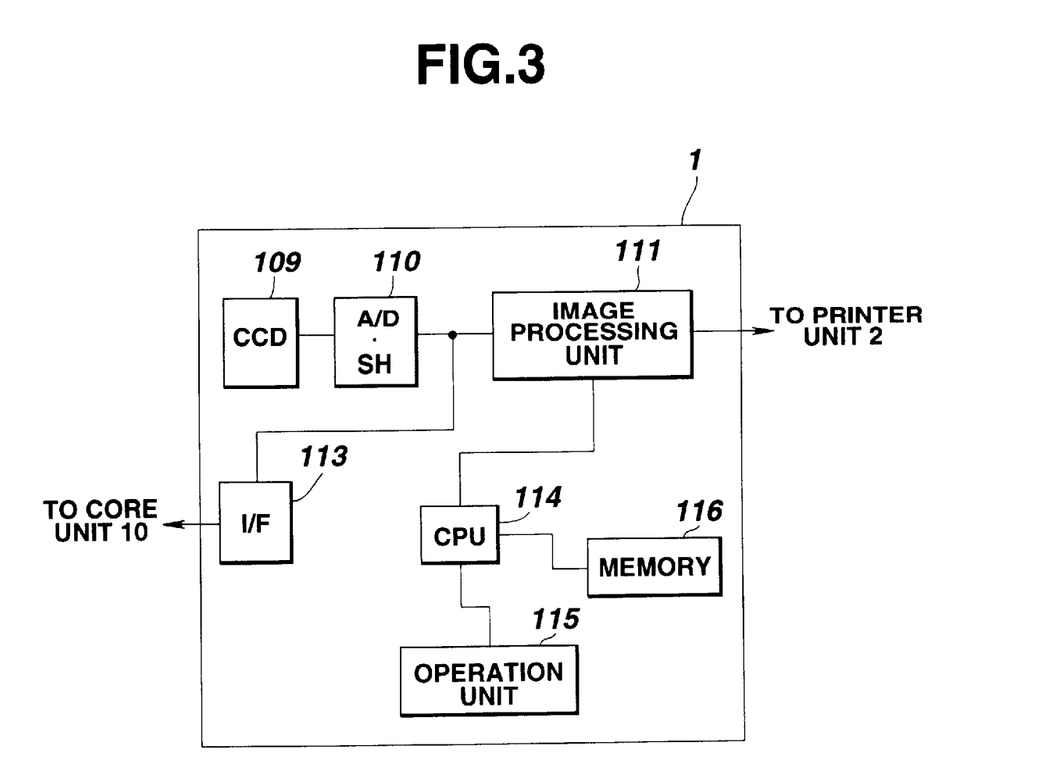
FIG. 3 is a block diagram illustrating the configuration of the reader unit 1.

FIG. 3 is a block diagram of the reader unit 1.

Image data output from the CCD 109 is subjected to analog-to-digital conversion and shading correction by an A/D(analog-to-digital).SH(shading) unit 110. The image data processed by the A/D.SH unit 110 is transferred to the printer unit 2 via an image processing unit 111 and to the core unit 10 of the image input/output control unit 3 via an interface unit 113. A CPU (central processing unit) 114 controls the image processing unit 111 and the interface unit 113 in accordance with the contents set by an operation unit 115. For example, when a copying mode of performing a copying operation while performing trimming processing is set by the operation unit 115, the CPU 114 performs control so that the image data is subjected to trimming processing by the image processing unit 111 and the resultant image data is transferred to the printer unit 2. When a facsimile transmission mode is set by the operation unit 115, the CPU 114 performs control so that the image data and a control command corresponding to the set mode are transferred from the interface unit 113 to the core unit 10. Control programs for such control of the CPU 114 are stored in a memory 116. The CPU 114 performs control by referring to data stored in the memory 116. The memory 116 is also used as operational areas for the CPU 114.

Figure 4:
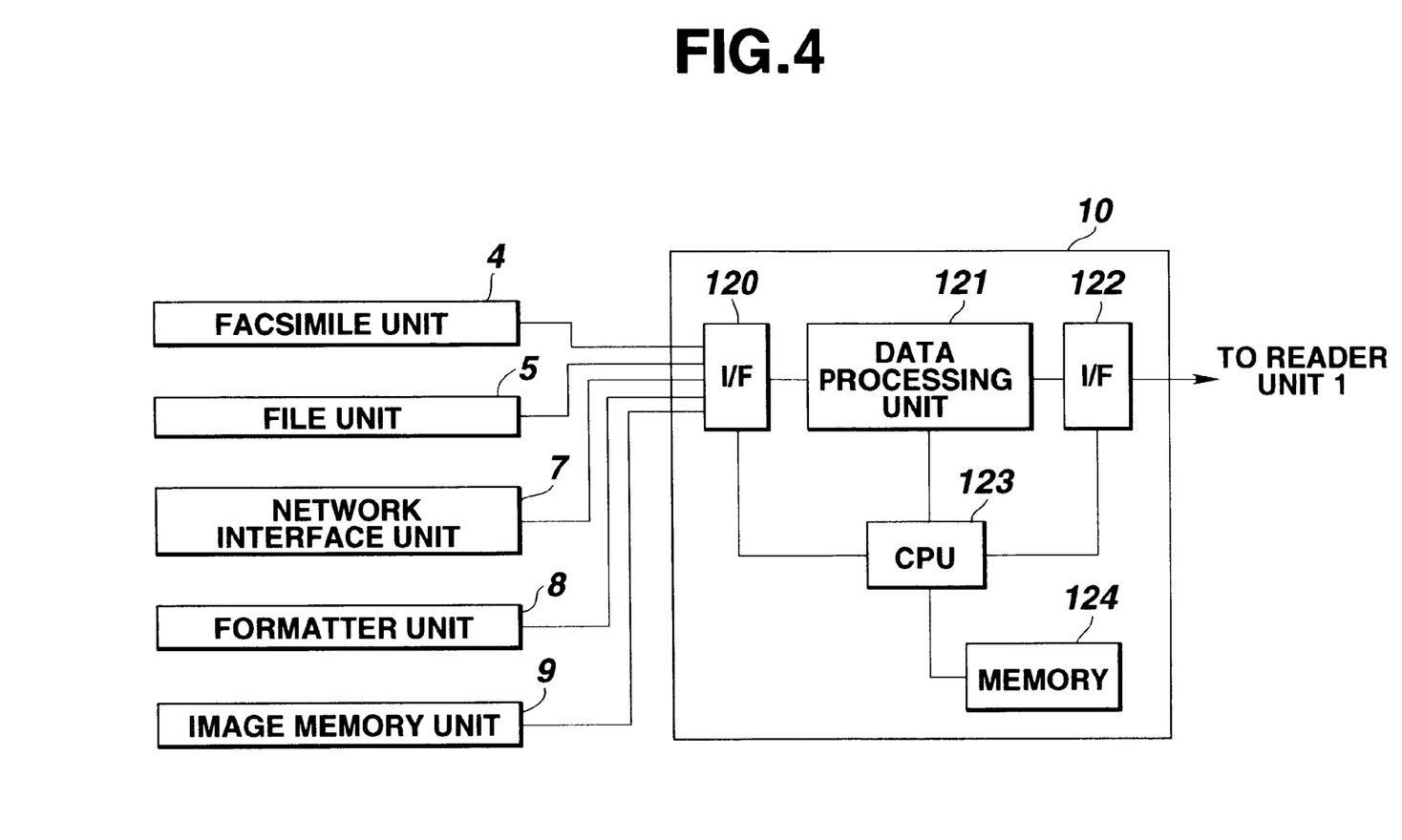
FIG. 4 is a block diagram illustrating the configuration of a core unit 10 shown in FIG. 1.

FIG. 4 is a block diagram of the core unit 10.

Image data from the reader unit 1 is transferred to a data processing unit 121, and a control command from the reader unit 1 is transferred to a CPU 123. The data processing unit 121 performs image processing, such as rotation processing, magnification varying processing or the like of the image. The image data transferred from the reader unit 1 to the data processing unit 121 is transferred to the facsimile unit 4, the file unit 5 or the network interface unit 7 in accordance with the control command transferred from the reader unit 1. Code data representing the image input via the network interface unit 7 is transferred to the data processing unit 121, and then to the formatter unit 7 to be developed into image data. The obtained image data is transferred to the data processing unit 121, and then to the facsimile unit 4 or the printer unit 2.

Image data from the facsimile unit 4 is transferred to the data processing unit 121, and then to the printer unit 2, the file unit 5 or the network interface unit 7. The image data from the file unit 5 is transferred to the data processing unit 121, and then to the printer unit 2, the facsimile unit 4 or the network interface unit 7.

The CPU 123 performs the above-described control in accordance with control programs stored in the memory 124, and the control command transferred from the reader unit 1. The memory 124 is also used as operational areas for the CPU 123. Thus, it is possible to perform processing in which such functions as reading of an image of an original, printing of the image, transmission/reception of image data, storage of the image data, input/output of data from a computer and the like are combined.

The timing of updating (addition) of a control program, and the like for each optional board is set for the memory 124 from the operation unit 115, the facsimile unit 4 or the network interface unit 7.

Figure 5:
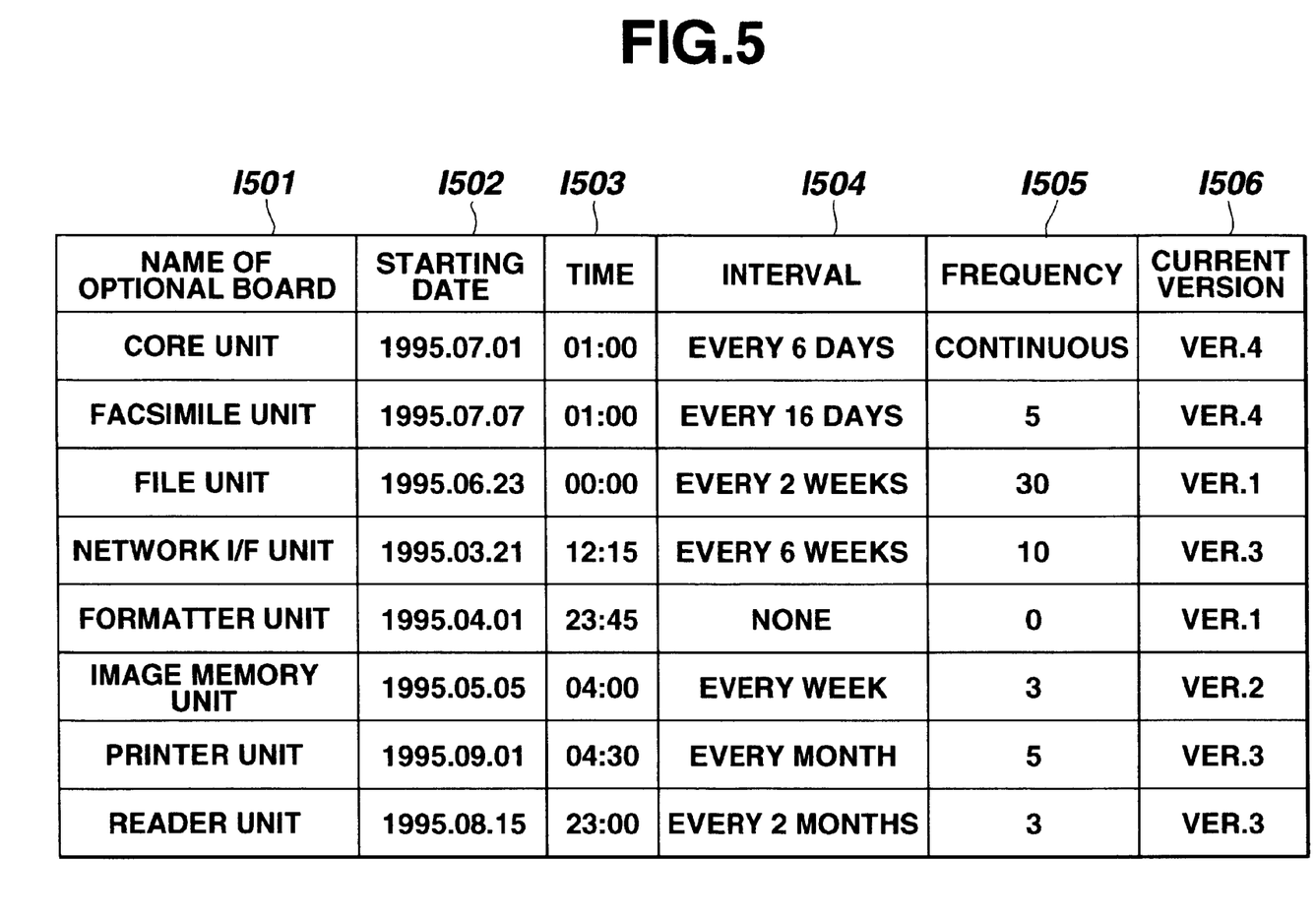
FIG. 5 is a table illustrating the contents of setting of time for version-updating.

FIG. 5 illustrates the details of information to be set. The items to be set are the name of each optional board i501, the starting date i502, the time i503, the interval i504, the frequency i505, and the current version i506. The item of the name of each optional board need not be input/set by the operator. When the core unit 10 detects that each optional board is mounted, the name of the optional board is automatically listed. The date of start of a version-updating cycle performed at a repeated interval is input as the starting date i502. The cycle of version-updating is set in the item of the interval i504. When only a single version-updating operation is performed, the word "none" is set. When performing a plurality of version-updating operations, the interval is set in units of a day, a week or a month. The frequency of version-updating operations at the interval set in the item of the repetition interval i504 is set in the item of the frequency i505. When the word "none" is set in the item i504, the frequency automatically becomes 0. In other cases, the frequency of repetion is input. When the frequency is not specified, the word "continuous" is set. If the dates of different version-updating operations coincide or are close to each other, or when performing version-updating operations by operating a plurality of optional boards at the same time, actual version-updating operations are appropriately performed according to a preset priority order. The item of the current version i506 indicates the version of the program which is currently stored. This item need not be input/set by the operator. When downloading the latest program, the version of that program is automatically set. The information shown in FIG. 5 is displayed on the operation unit 115 or is output to an external apparatus by performing a predetermined operation. The starting time of version-updating may be set in accordance with the operational state of the apparatus.

Figure 6:
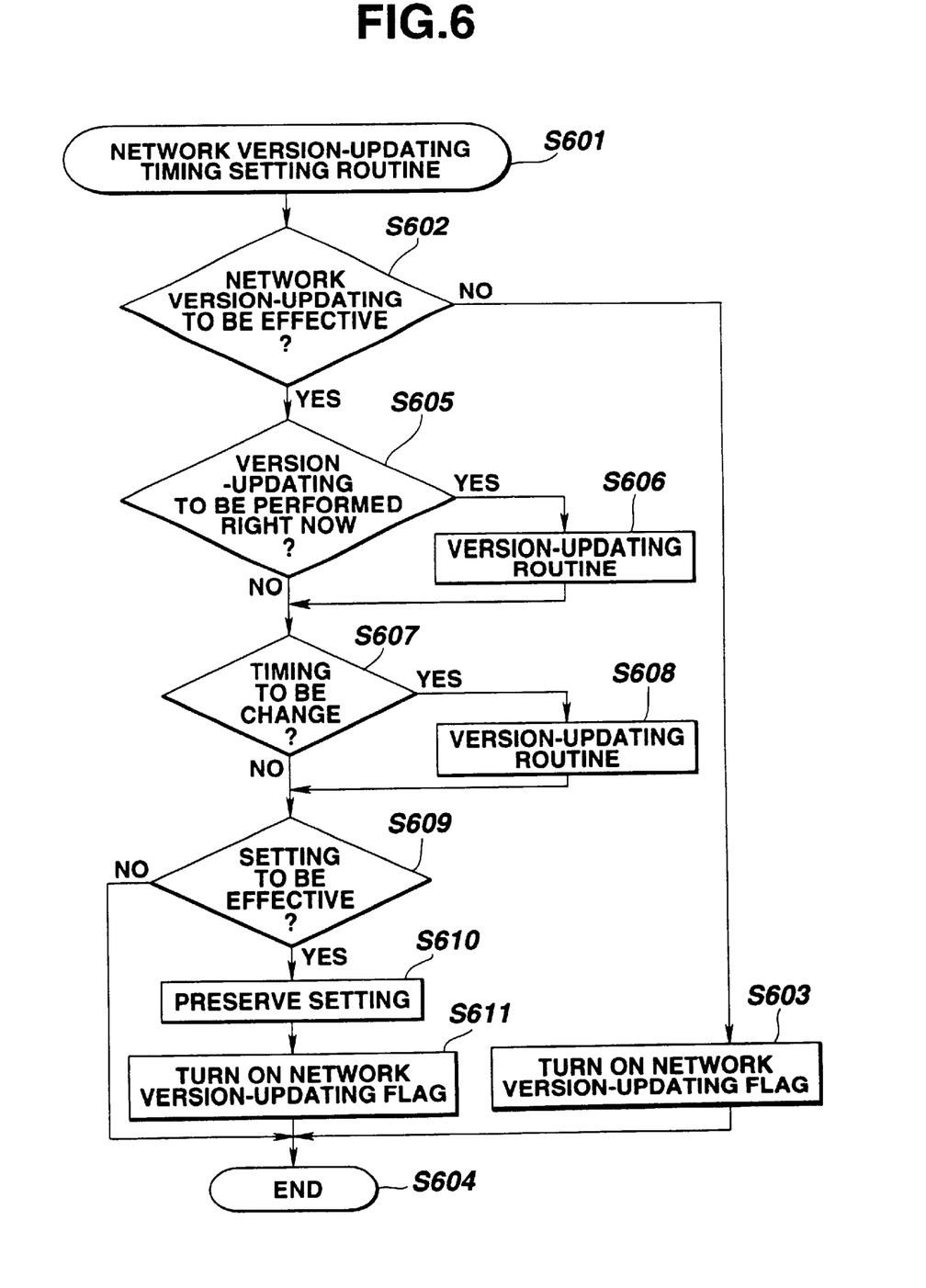
FIG. 6 is a flowchart illustrating the flow of processing when setting a time for version-updating via a network.

FIG. 6 is a flowchart illustrating the flow of processing of a routine to set the timing of version-updating. This flowchart shows the flow of processing performed by the CPU 123 based on the program stored in the memory 124. Although a description is provided for a case of setting a timing via the network interface unit 7, processing is also performed according to substantially the same flow when setting a timing from the facsimile unit 4 or the operation unit 115. This routine is executed when a predetermined command is input via the network interface unit 7, or by performing a predetermined operation by the operation unit 115.

In step S602, it is determined if a version-updating operation of the concerned optional board via the network interface unit 7 is to be effective, via the network interface unit 7 or from the operation unit 115. If the result of the determination in step S602 is negative, the process proceeds to step S603, where a network version-updating flag is turned off, and the process is terminated in step S604.

If the result of the determination in step S602 is affirmative, the process proceeds to step S605, where it is determined if a network version-updating operation is to be presently performed, via the network interface unit 7 or by the operation unit 115. If the result of the determination in step S605 is affirmative, the process proceeds to step S606, where a routine for version-updating is called, and a version-updating operation is sequentially performed according to predetermined procedures, and the process proceeds to step S607. If the result of the determination in step S605 is negative, the process proceeds to step S607.

In step S607, it is determined if the setting of the timing for performing a version-updating operation is to be changed. If the result of the determination in step S607 is affirmative, the process proceeds to step S608, where items as shown in FIG. 5 are set by executing a setting change routine, and the process proceeds to step S609. If the result of the determination in step S607 is negative, the process proceeds to step S609.

In step S609, it is determined if the contents changed in step S608 are to be effected, via the network interface unit 7 or by the operation unit 115. If the result of the determination in step S609 is negative, the process proceeds to step S604. If the result of the determination in step S609 is affirmative, the process proceeds to step S610, where the contents of the setting are preserved. In step S611, the network version-updating flag is turned on, and the process is terminated in step S604.

Figure 7:
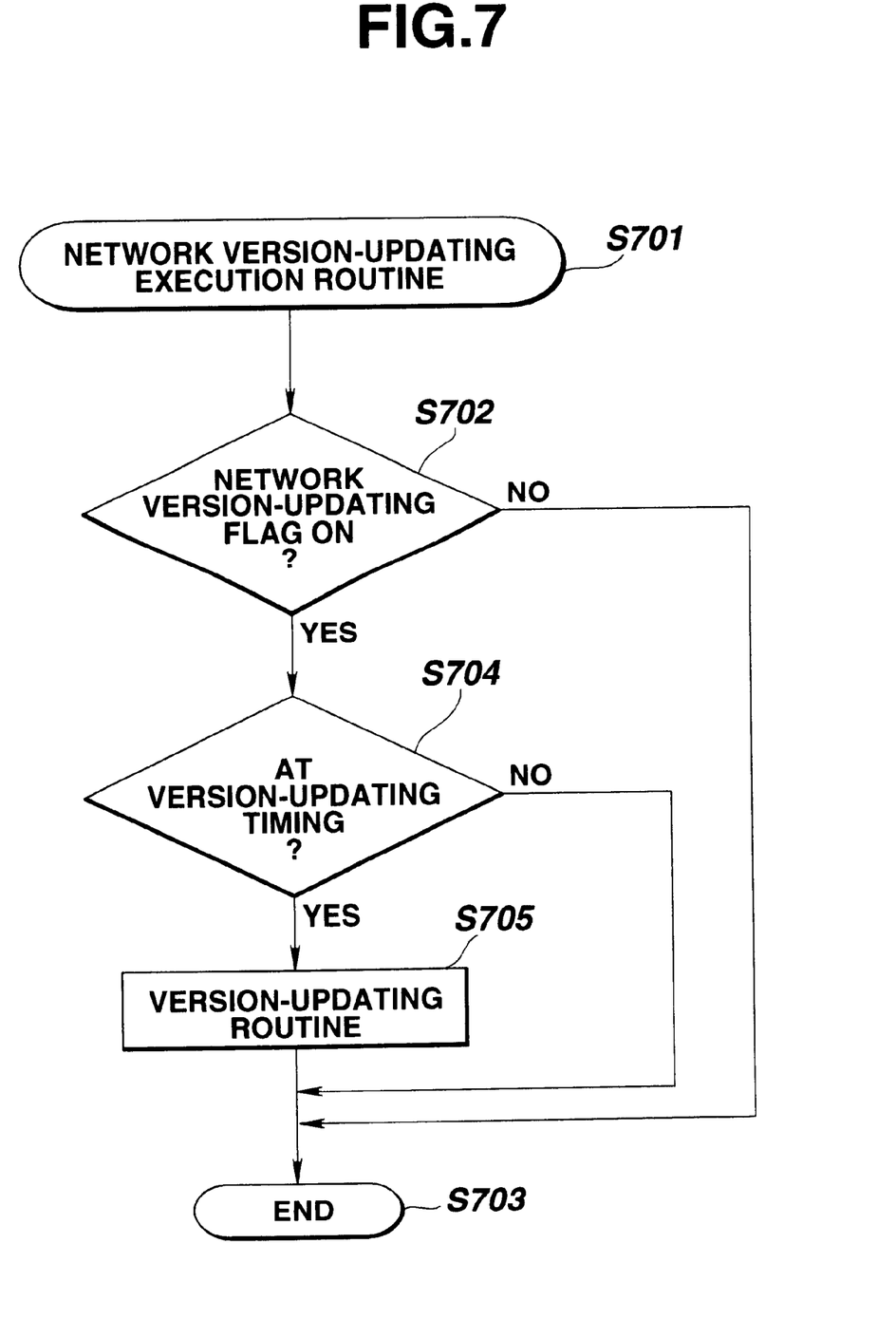
FIG. 7 is a flowchart illustrating the flow of processing when performing version-updating via the network.

FIG. 7 is a flowchart illustrating the flow of the processing of a network version-updating execution routine. This routine is always simultaneously executed by the core unit 10 with the turning on of the power supply of the image input/output control unit 3. In step S702, it is determined if the network flag-updating flag is "on". If the result of the determination in step S702 is negative, the process is terminated in step S703. If the result of the determination in step S702 is affirmative, the process proceeds to step S704, where it is determined if the current time is at the time set as shown in FIG. 5. If the result of the determination in step S704 is affirmative, i.e., if there is an optional board whose version-updating time equals the current time, the PC/WS 11 or the file server 14 (an apparatus storing data for version-updating) on the LAN is notified of the arrival of the time, and the process proceeds to step S705, where a version-updating operation for the concerned optional board is performed, and the process is terminated in step S703. If the result of the determination in step S704 is negative, i.e., if there is no optional board whose time equals the current time, the process is terminated in step S703.

Figure 8:
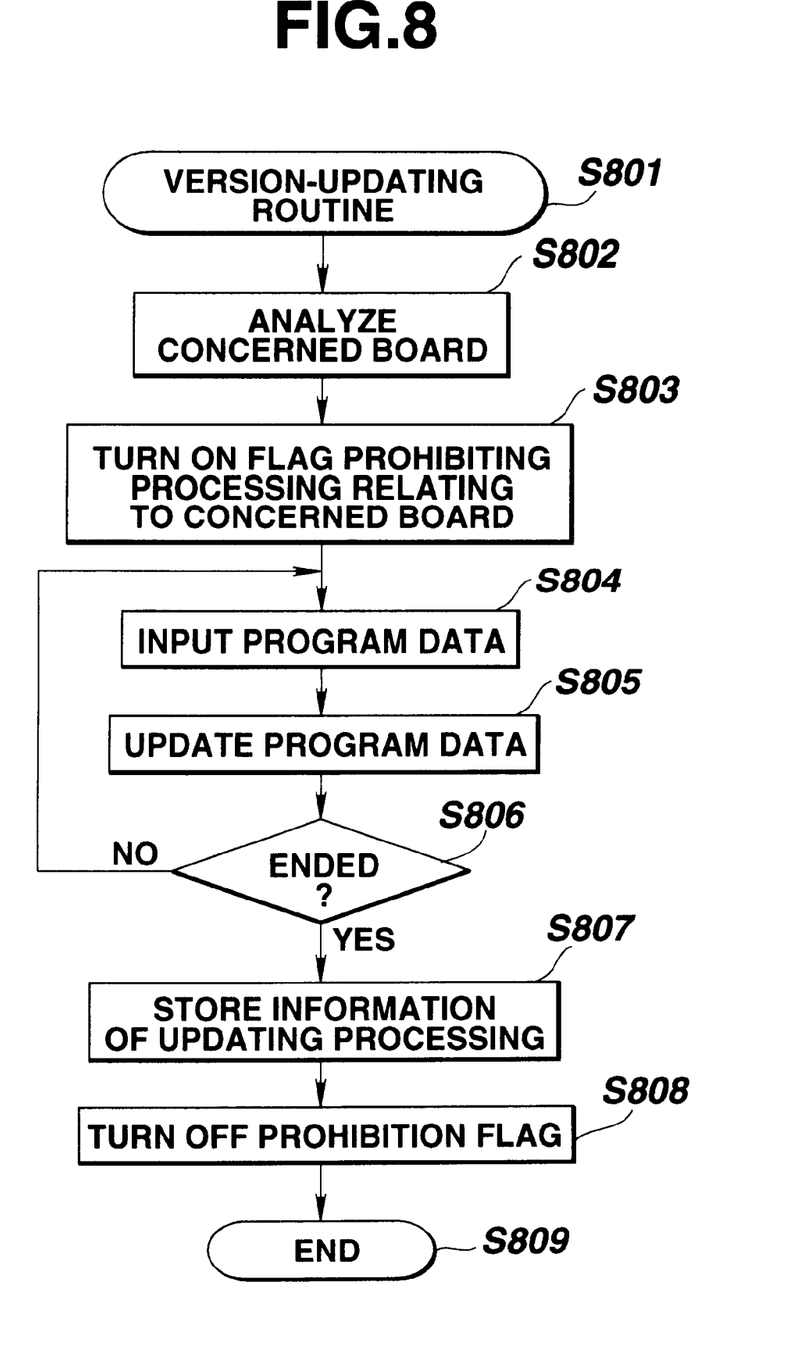
FIG. 8 is a flowchart illustrating the flow of processing of version updating for an optional board.

Next, a description is provided of the processing of the version-updating routine of step S705. FIG. 8 is a flowchart illustrating the flow of the processing of the version-updating routine. This flowchart also illustrates the flow of the processing performed by the CPU 123 based on the programs stored in the memory 124.

First, in step S802, the concerned optional board is analyzed based on program data to be updated (program data whose set updating time equals the current time). In step S803, a flag prohibiting processing relating to the optional board to be updated is turned on. However, as for the core unit 10 serving as a main board, for example, when updating the facsimile function, only processing relating to the facsimile function is prohibited, and other functions are allowed to operate. When updating control programs for the entire core unit 10, processing of the entire apparatus is prohibited.

When it has been confirmed that processing relating to the concerned optional board normally stops, in the next step S804, program data for updating is input from the PC/WS 11 or the file server 14 on the LAN via the network interface unit 7. At that time, the concerned optional board is in a standby state of version-updating. This program data is stored in the memory of the concerned optional board to update the previously stored program data. This processing is repeated until it is determined in step S806 that the processing is ended.

Upon completion of the data updating processing, then, in step S807, updating-processing information, such as version information of updated data, date of updating processing, and the like, is stored. In step S808, the prohibition flag turned on in step S803 is turned off, and the process is terminated in step S809. Version-updating processing for the printer unit 2 is peformed when the power supply of the engine unit of the printer unit 2 is turned off.

As described above, according to the present embodiment, the inside of an image processing apparatus, or an external processing apparatus (an image input/output control unit 3) including a main board (a core unit 10) and a plurality of optional boards comprises a network interface unit 7 connected to a work station or the like, a formatter unit 8 for developing code data in a bit-map memory, a facsimile unit 4 for transmitting/receiving bit-map data or code data via a public telephone line, various types of data processing units of the core unit 10 having divided functions for respective contents of data processing, and a CPU 123 for controlling the entirety of these units. Latest data of firmware or software for operating the respective processing units is provided in a server on a network. The CPU 123 performs version-updating of the concerned optional board by inputting data via the network interface unit 7 at a preset timing. Thus, it is possible to automatically perform version-updating processing without human intervention in a state in which the apparatus is not used (for example, at night or during a holiday).

If similar apparatuses are connected to the network, version-updating operations may be consecutively performed.

The present invention may be applied to a system comprising a plurality of apparatuses (such as a host computer, an interface apparatus, a reader, a printer and the like), or to an apparatus comprising a single unit (such as a copier, a facsimile apparatus or the like).

The present invention may also be applied to a case in which, in order to realize the functions of the above-described embodiment, a computer of an apparatus or a system connected to various types of devices is supplied with a program code of software for realizing the functions of the embodiment so as to operate the various kinds of devices according to programs stored in the computer (a CPU or an MPU (microprocessing unit)) of the apparatus or the system.

That is, by storing program data stored in the memory 124 in a detachable storage medium, such as a magneto-optical disk or the like, the functions of the present invention are easily realized by another apparatus to which the data is applied.

In the above-described case, the program code of the software itself realizes the functions of the embodiment. Hence, the present invention includes such a program code itself, and means for supplying the computer with the program code, such as a storage medium storing the program code.

A floppy disk, a hard disk, an optical disk, a magneto-optical disk, a CD-ROM (compact disc-read only memory), a magnetic tape, a nonvolatile memory card, a ROM, or the like may be used as the storage medium for storing such a program code.

Not only when realizing the functions of the embodiment by execution of the supplied program code by the computer, but also when realizing the functions of the embodiment by cooperation of the program code with an OS (operating system), any other application software or the like, such a program code is, of course, included in the embodiment.

In addition, a case in which the supplied program code is stored in a memory provided on a function-expanding board of the computer or in a function-expanding unit connected to the computer, then, a CPU or the like provided on the function-expanding board or in the function-expanding unit performs at least a part of actual processing, and the functions of the embodiment are realized by the processing is, of course, included in the present invention.

The individual components shown in outline or designated by blocks in the drawings are all well known in the data processing apparatus art and their specific construction and operation are not critical to the operation or the best mode of carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing apparatus for performing processing by at least one processing means, said apparatus comprising:
   input means for inputting data representing a control program for processing by the processing means;
   setting means for setting a time to change the data to be used in the processing means, wherein the set time is a specific time which is previously scheduled;
   determination means for determining if the current time has reached the time set by said setting means;
   changing means for starting to process a change of the data by using the data input by said input means when said determination means has determined that the current time has reached the set time; and
   control means for controlling said changing means to start changing the control program after inhibiting the processing by the processing means to which the control program is to be applied, based on the data input by said input means.

2. An apparatus according to claim 1, further comprising identification means for identifying processing means corresponding to the data to be input by said input means.

3. An apparatus according to claim 1, further comprising means for stopping processing by processing means corresponding to the data to be input by said input means when said determination means has determined that the current time has reached the set time.

4. An apparatus according to claim 1, further comprising means for storing setting information relating to the data input by said input means.

5. An apparatus according to claim 1, wherein the time set by said setting means relates to a date.

6. An apparatus according to claim 1, wherein the time set by said setting means relates to an operational state.

7. An apparatus according to claim 1, further comprising means for outputting data set by said setting means.

8. A method of controlling a data processing apparatus for performing processing by at least one processing means, said method comprising the steps of:
   inputting data representing a control program for processing by the processing means;
   setting a time to change the data to be used in the processing means, wherein the set time is a specific time which is previously scheduled;
   determining if the current time has reached the time set in said setting step;
   a changing step of starting to process a change of the data by using the data input by said inputting step when said determining step has determined that the current time has reached the set time; and
   controlling said changing step to start changing the control program after inhibiting the processing by the processing means to which the control program is to be applied, based on the data input by said inputting step.

9. A method according to claim 8, further comprising the step of identifying processing means corresponding to the data to be input in said inputting step.

10. A method according to claim 8, further comprising the step of stopping processing by processing means corresponding to the data to be input in said inputting step when said determining step has determined that the current time has reached the set time.

11. A method according to claim 8, further comprising the step of storing in said storage means setting information relating to the data input in said inputting step.

12. A method according to claim 8, wherein the time set in said setting step relates to a date.

13. A method according to claim 8, wherein the time set in said setting step relates to an operational state.

14. A method according to claim 8, further comprising the step of outputting data set in said setting step.

15. A data processing apparatus for performing processing by a plurality of processing means, said apparatus comprising:

input means for inputting data representing a control program for performing the processing by at least one of the plurality of processing means;

means for changing the data to be used in at least one of the plurality of processing means;

discrimination means for discriminating which one of the plurality of processing means uses the data input by said input means;

determination means for determining whether the operation of each of the plurality of processing means is to be permitted or inhibited in accordance with a discrimination result by said discrimination means; and control means for controlling said means for changing the data to start changing the data based on determination by said determination means after inhibiting the operation of the processing means to which the control program is to be applied, based on the data input by said input means.

16. An apparatus according to claim 15, wherein said means for changing the date changes a version of the control program.

17. An apparatus according to claim 15, wherein one of the plurality of processing means includes reading means for reading an image on an original.

18. An apparatus according to claim 15, wherein one of the plurality of processing means includes printing means for printing an image based on input image data.

19. An apparatus according to claim 15, wherein one of the plurality of processing means includes communicating means for communicating via a telephone line.

20. An apparatus according to claim 15, further comprising means for storing a schedule for changing the data of each of the plurality of processing means, wherein said means for changing the data changes the data in accordance with the stored schedule.

21. A data processing method of performing processing by a plurality of processing means, said method comprising:

an input step of inputting data representing a control program for performing the processing by at least one of the plurality of processing means;

a changing step of changing the data to be used in at least one of the plurality of processing means;

a discrimination step of discriminating which one of the plurality of processing means uses the data input by said input step;

a determination step of determining whether the operation of each of the plurality of processing means is to be permitted or inhibited in accordance with a discrimination result by said discrimination step; and controlling said changing step of changing the data to start changing the data based on determination by said determination step after inhibiting the operation of the processing means to which the control program is to be applied, based on the data input by said input step.

22. The method according to claim 21, wherein said changing step of changing the data changes a version of the control program.

23. The method according to claim 21, wherein one of the plurality of processing means includes reading means for performing a reading step of reading an image on an original.

24. The method according to claim 21, wherein one of the plurality of processing means includes printing means for performing a printing step of printing an image based on input image data.

25. The method according to claim 21, wherein one of the plurality of processing means includes communicating means for performing a communicating step of communicating via a telephone line.

26. The method according to claim 21, further comprising a storing step of storing a schedule for changing the data of each of the plurality of processing means, wherein said changing step changes the data in accordance with the stored schedule.

27. A computer readable medium having recorded therein codes for implementing a computer implementable method of performing data processing by at least one processing means, comprising the steps of:

inputting data representing a control program for processing by the processing means;

setting a time to change the data to be used in the processing means, wherein the set time is a specific time which is previously scheduled;

determining if the current time has reached the time set in said setting step;

a changing step of starting to process a change of the data by using the data input by said inputting step when said determining step has determined that the current time has reached the set time; and controlling said changing step to start changing the control program after inhibiting the processing by the processing means to which the control program is to be applied, based on the data input by said inputting step.

28. A computer readable medium having recorded thereon codes for implementing a computer implementable method of performing processing by a plurality of processing means, said method comprising;

an input step of inputting data representing a control program for performing the processing by at least one of the plurality of processing means;

a changing step of changing the data to be used in at least one of the plurality of processing means;

a discrimination step of discriminating which one of the plurality of processing means uses the data input by said input step;

a determination step of determining whether the operation of each of the plurality of processing means is to be permitted or inhibited in accordance with a discrimination result by said discrimination step; and a control step of controlling said changing step of changing the data to start changing the data based on determination by said determination step after inhibiting the operation of the processing means to which the control program is to be applied, based on the data input by said input step.

* * * * *

UNITED STATES PATENT AND TRADEMARK OFFICE
CERTIFICATE OF CORRECTION

PATENT NO.    : 6,204,928 B1
DATED         : March 20, 2001
INVENTOR(S)   : Hironobu Nakai It is certified that error appears in the above-identified patent and that said Letters Patent is hereby corrected as shown below:

Drawings,
Sheet 6, Figure 6, "CHANGE" should read -- CHANGED --.

Column 1,
Line 8, "for" should read -- of --; and
Line 31, "laber" should read -- labor --.

Column 2,
Line 24, "time" should read -- times --; and
Line 66, "magnetooptical-disk" should read -- magneto-optical disk --.

Column 3,
Line 23, "originals" should read -- originals, --.

Column 4,
Line 37, "7" should read -- 8 --.

Column 5,
Line 22, "115" should read -- 115 (FIG. 3) --.

Column 9,
Line 39, "date" should read -- data --.

Signed and Sealed this

Twenty-third Day of April, 2002

Attest:

Attesting Officer

JAMES E. ROGAN
*Director of the United States Patent and Trademark Office*